United States Patent [19]

Piter et al.

[11] 4,392,713

[45] * Jul. 12, 1983

[54] ARRANGEMENT FOR ALIGNEDLY COUPLING TWO COATED LIGHT-CONDUCTIVE FIBERS

[75] Inventors: Hans Piter, Cologne; Klaus Serapins, Berg. Gladbach-Refrath, both of Fed. Rep. of Germany

[73] Assignee: Felten & Guilleaume Carlswerk AG, Cologne, Fed. Rep. of Germany

[ * ] Notice: The portion of the term of this patent subsequent to Sep. 23, 1997, has been disclaimed.

[21] Appl. No.: 89,107

[22] Filed: Oct. 29, 1979

Related U.S. Application Data

[62] Division of Ser. No. 890,192, Mar. 27, 1978, Pat. No. 4,223,979.

[30] Foreign Application Priority Data

Mar. 31, 1977 [DE] Fed. Rep. of Germany ....... 2714327
Apr. 13, 1977 [DE] Fed. Rep. of Germany ....... 2716222

[51] Int. Cl.³ ............................................. G02B 7/26
[52] U.S. Cl. ................................................ 350/96.21
[58] Field of Search ........................... 350/96.20–96.22

[56] References Cited

U.S. PATENT DOCUMENTS

| | | | |
|---|---|---|---|
| 3,734,594 | 5/1973 | Trambarulo | 350/96.21 |
| 4,047,796 | 9/1977 | Kao et al. | 350/96.21 |
| 4,050,783 | 9/1977 | Tardy | 350/96.21 |
| 4,061,416 | 12/1977 | Stewart | 350/96.21 |
| 4,076,376 | 2/1978 | Slaughter | 350/96.21 |
| 4,080,044 | 3/1978 | Gousseau | 350/96.21 |
| 4,087,157 | 5/1978 | Hodges | 350/96.21 |
| 4,223,979 | 9/1980 | Piter et al. | 350/96.21 |

OTHER PUBLICATIONS

W. Weidhaas, "Optical Fibre Cables and Accessories" 3rd European Conf. on Optical Communications, Conf. Proceedings Munich, W. Germany, Sep. 1977.

*Primary Examiner*—John D. Lee
*Assistant Examiner*—Frank Gonzalez
*Attorney, Agent, or Firm*—Michael J. Striker

[57] ABSTRACT

An arrangement for alignedly coupling two coated light-conductive fibers includes three clamping rods which are supported in a support sleeve by a deflectable element and two actuating elements are introduced into the sleeve from two opposite ends thereof and inwardly deflect the deflectable element to press the clamping rods into a clamping engagement with the stripped portions of light-conductive fibers located therebetween. Each of the actuating elements has a longitudinal channel therein through which the respective light-conductive fibers to be coupled pass, each channel including three sections one of which receives the coated cable, another one of which accepts the stripped end portion of the cable, and a next one of which accommodates ends of the clamping rods. Because of its configuration, the channel pre-aligns the fiber with a passage defined by the clamping rods during the introduction of the fiber into the arrangement. The support sleeve may consist of two components one of which is configurated as a receptacle for partially receiving the other component in a plug-in fashion to facilitate assembly and disassembly of the components. In the latter event, each of the fibers to be coupled is attached to one of the components of the support sleeve even when the components are disassembled from one another.

14 Claims, 5 Drawing Figures

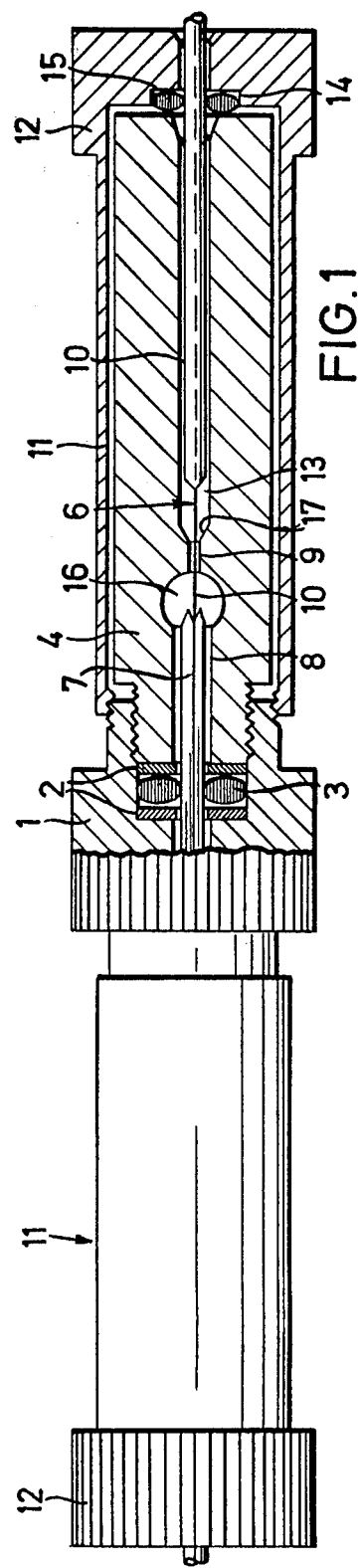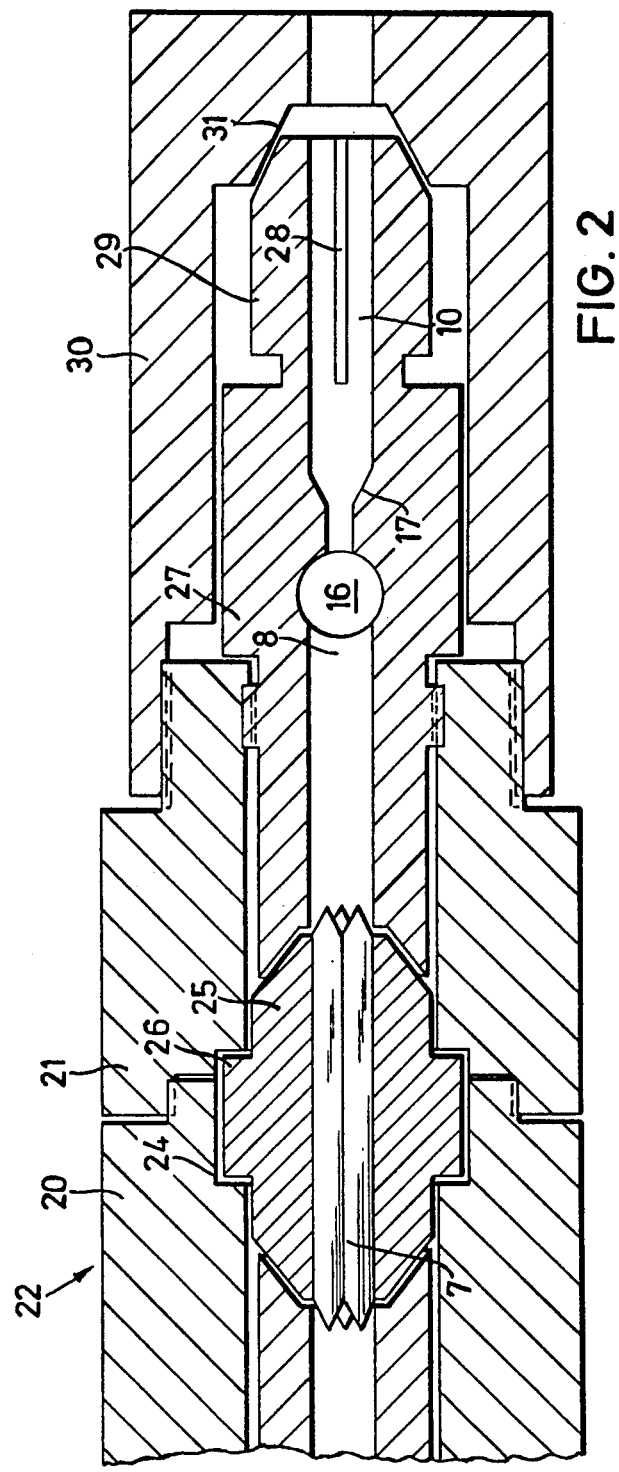

ARRANGEMENT FOR ALIGNEDLY COUPLING TWO COATED LIGHT-CONDUCTIVE FIBERS

This is a division of application Ser. No. 890,192, filed Mar. 27, 1978, now U.S. Pat. No. 4,223,979.

BACKGROUND OF THE INVENTION

The present invention relates to a coupling arrangement in general, and more particularly to an arrangement for alignedly coupling two coated light-conductive fibers.

There are already known various arrangements for coupling or alignedly interconnecting two light-conductive fibers at their end portions. The light-conductive fibers, which are usually used for transmitting signals or the like, are, more often than not, externally coated in order to minimize intensity losses of the light being transmitted through the light-conductive fibers. While the distance which is to be traversed by the light rays conducted through the light-conductive fiber may be sometimes small enough for use of only a single section of the light-conductive fiber, it is often necessary to compose a light-conductive line of a plurality of such sections, particularly when the distance to be traversed exceeds the length of a single available light-conductive fiber section. When this is the case, it is necessary to securely connect the light-conductive fiber sections with one another in such a manner that the end portions of the light-conductive fiber sections which are juxtaposed with one another at their respective end faces are in perfect axial alignment with one another in order to avoid light losses at the juncture of the sections.

To achieve this axial alignment of the light-conductive fibers of the sections, it has already been proposed to mount three clamping bars in a support sleeve in such a manner that the axes of these clamping bars are located at the vertices of an imaginary isosceles triangle so that the clamping bars define between themselves a passage in which the light-conductive fibers to be joined or coupled are received. Then, the clamping bars are pressed inwardly against the end portions of the light-conductive fibers received therebetween, thereby clampingly engaging the two end portions in a perfect axial alignment with one another. Usually, the inward pressing is performed by deflectable members which are acted upon, in the axial direction, by actuating elements which are introduced into the support sleeve through the respective end portions thereof.

The coupling arrangement of the above-mentioned type excellently solves the problem of precisely aligning the end portions of the light-conductive fibers with one another and of arresting the end portions in their aligned positions. However, experience with this conventional arrangement has shown that, particularly in view of the relatively small transverse dimensions of the light-conductive fibers, it is very difficult to introduce the end portions of the light-conductive fibers into the passage defined between the clamping rods. Another problem which has been encountered in the above-discussed conventional coupling arrangement is that, in some applications, it is necessary to disassemble the connection of the light-conductive fibers. The above-mentioned conventional arrangement is not capable of disassembly without a complete dismantling of the coupling arrangement, which is a rather serious drawback in the above-mentioned applications inasmuch as it involves a very time-consuming disassembling and assembling operation.

SUMMARY OF THE INVENTION

Accordingly, it is a general object of the present invention to avoid the disadvantages of the prior art.

More particularly, it is an object of the present invention to develop a coupling arrangement for light-conductive fibers which is not possessed of the above-mentioned disadvantages of the prior-art arrangements of this type.

A further object of the present invention is to so construct the coupling arrangement of the type here under consideration as to permit pre-alignment of the end portions of the light-conductive fibers with the passage defined between the clamping rods, during the introduction of the fibers into the arrangement.

A still another object of the present invention is to develop an arrangement of this type which can be disassembled in a simple manner without a complete dismantling of the arrangement.

A concomitant object of the present invention is to provide a coupling arrangement for light-conductive fibers which is simple in construction, inexpensive to manufacture and assemble, and reliable nevertheless.

In pursuance of these objects and others which will become apparent hereafter, one feature of the present invention resides, briefly stated, in an arrangement for alignedly coupling two coated light-conductive fibers, which comprises a support sleeve; three clamping rods; means for so mounting said clamping rods in the support sleeve as to extend parallel to each other and define with one another a passage for receiving respective stripped end portions of the light-conductive fibers, including at least one deflectable portion; means for inwardly deflecting the deflectable portion to press the clamping rods into a clamping contact with the end portions of the light-conductive fibers, including an actuating element; and means for pre-aligning at least the end portion of at least one of the light-conductive fibers with the passage during the introduction thereof in a given direction into the arrangement, including internal surfaces in the actuating element which bound a channel for the one light-conductive fiber, the channel extending in the above-mentioned direction and including, as considered opposite to the above-mentioned direction, a first section having a first cross-section large enough to partially receive the clamping rods, a second section having a second cross section coordinated to that of the stripped end portion, and a third section having a third cross section coordinated to that of the coated light-conductive fiber. When the actuating element is configurated, in accordance with the present invention, in the above-mentioned manner, there is obtained a guidance and a pre-alignment of the respective end portion of the light-conductive fiber within the actuating element. It will be appreciated that the respective end portion of the light-conductive fiber will be pre-aligned with the above-mentioned passage between the clamping rods, in view of the fact that, while the stripped end portion of the respective light-conductive fiber passes through the second section of the channel, this end portion of the light-conductive fiber is pre-adjusted to the end portions of the clamping rods which are received in the first section of the channel, and particularly to the passage which is bounded by the clamping rod. Afterwards, the final alignment of the juxtaposed end portions of the two light-conductive fibers relative to one another is obtained during the inward movement of the clamping rods which occurs during the axial displacement of the actuating element relative to the support sleeve. The best results in terms of alignment are achieved when the clamping rods are substantially cylindrical and have the same diameter and smooth external surfaces and when the above-mentioned actuating element is elongated and the above-mentioned channel extends along the longitudinal axis thereof.

It is further advantageous, as proposed by the present invention, to so configurate the internal surfaces which bound the channel as to include a conical transition between the third and second sections of the channel. When the channel is configurated in this manner, the centering or pre-alignment of the stripped end portions of the light-conductive fibers is further improved.

According to one currently preferred aspect of the present invention, the actuating element is constructed as a screw which is adapted to be threaded into the support sleeve. Then, it is further advantageous when the deflectable portion of the mounting means is an elastically yieldable O-ring which is interposed between the screw and the support sleeve and which is inwardly deflected upon tightening of the above-mentioned screw. It is further advantageous in this context when the mounting means further includes two distancing rings interposed between the O-ring and the screw, on the one hand, and the O-ring and the support sleeve, on the other hand. It is further proposed by the present invention to provide means for de-tensioning at least that portion of the one light-conductive fiber which is accommodated in the above-mentioned channel, the de-tensioning means including a protective socket surrounding the screw and having one end connected to, and another end remote from, the support sleeve, and means for engaging the one light-conductive fiber at the other end of the protective socket and for transmitting tensile forces from the one light-conductive fiber to the protective socket. Now, when the arrangement is constructed according to this concept of the present invention, it is achieved that the guidance, the pre-alignment, the de-tensioning and the final alignment of the end portions of the light-conductive fibers can be performed in a single coupling arrangement. In addition thereto, the protective socket also serves as a protection against penetration of dust or moisture toward the stripped end portions of the light-conductive fibers, and as a heat protection for the latter.

It is further advantageous when the above-mentioned one end of the protective socket is threadedly connected to the support sleeve, and when the engaging means includes an elastically yieldable O-ring interposed between the other end of the protective socket and surrounding the one light-conductive fiber, the elastically yieldable O-ring being inwardly deflected into engagement with the one light-conductive fiber upon tightening of the protective socket. Then, it is further proposed for the other end of the protective socket to have an opening for the one light-conductive fiber, and an internal recess next to and around the opening in which the above-mentioned O-ring is accommodated. When the protective sleeve is constructed in the above-mentioned manner, the coating of the respective light-conductive fiber is prevented from shifting in that the above-mentioned O-ring presses against the coating during the tightening of the screw.

However, the above-mentioned de-tensioning means may also be constructed, according to a further facet of the present invention, in such a manner that the engaging means includes a deflectable end portion of the above-mentioned screw which has a conically diverging configuration, and a conical abutment surface of a configuration generally corresponding to that of the deflectable end portion, the conical abutment surface being located on the other end of the protective sleeve and acting on the deflectable end portion to inwardly deflect the same into engagement with the one light-conductive fiber and especially with the coating thereof. To increase the flexibility of the deflectable end portion, it is proposed by the present invention to form the deflectable end portion of the screw with at least one slot which extends longitudinally of the screw and enables the deformable end portion to be deformed.

It is further proposed, in accordance with an advantageous development of the present invention, to construct the mounting means as a mounting body which has at least one conically converging end portion that constitutes the above-mentioned deflectable portion which cooperates with the three clamping rods. Advantageously, the mounting body includes two mounting members which are separated from each other substantially parallel to the one direction. It is also advantageous for the support sleeve to include two parts which are connected to one another, and for the mounting body to have a portion which is received between the parts of the support sleeve. In this connection, it is further proposed by the present invention to provide the screw with a conical recess which is complementary to the converging end portion of the mounting body at that end thereof which cooperates with the latter. When the mounting body, which may be of a metallic material, is used as the deflectable portion instead of the elastic O-rings, there is obtained the advantage that, as a result of this construction, the deflectable portion and also the entire mounting body is substantially independent of any temperature changes. Similarly, the above-mentioned cooperation of the conical end portion of the screw with the conical abutment surface also achieves a temperature-independent de-tensioning of the light-conductive fiber.

Furthermore, in order to achieve a temperature-independent clamping and alignment of the end portions of the light-conductive fibers in the support sleeve, it is further proposed by the present invention to provide the actuating element with a cylindrical portion which surrounds the first section of the channel and which has an elongated slot therein. Then, it is advantageous to form the above-mentioned deflectable portion of the mounting means as a helical spring which surrounds the three clamping rods and which has an end portion which is received in the elongated slot of the actuating element whereby the spring is reduced in diameter upon rotation of the actuating element relative to the support sleeve and presses the clamping rods against the end portions of the light-conductive fibers received therebetween. In the arrangement of this construction, it is further advantageous when the actuating element has at least one projection thereon and the support sleeve has a recess therein in which the projection is received upon assembly of the actuating element with the support sleeve. The above-mentioned recess which is very advantageously configurated as a through slot in the support sleeve, is generally I-shaped and has one leg which extends substantially axially, and another leg which extends substantially circumferentially, of the support sleeve. This arrangement is particularly advantageous when the actuating element is partially received in the support sleeve and when the projection extends radially outwardly from the actuating element and into the recess or slot during and upon assembly of the actuating element with the support sleeve. This arrangement has the advantage that, by simple introduction of the projection into the L-shaped recess or slot an by rotating the actuating element relative to the support sleeve, it is possible to tension the helical spring and thus reduce the diameter thereof. An adjustment of the position of the actuating element axially of and relative to the support sleeve, is even more advantageous when the actuating element has an external thread thereon, and when an adjusting nut is threaded onto the external thread of the actuating element and engages the support sleeve.

According to the present invention, it is further advantageous when the actuating element has a radially extending inspection opening between the first and second sections of the channel. When this inspection opening is provided, it is possible to observe the end portion of the light-conductive fiber during the introduction thereof into the passage between the clamping rods. A further advantageous aspect of the present invention resides in the face that the second section of the above-mentioned channel is cylindrical and has a diameter which amounts to two to three times that of the stripped end portion of the light-conductive fiber. When the second section of the channel is dimensioned in this way, it is achieved, on the one hand, that the stripped end portion of the light-conductive fiber can be easily introduced into the arrangement and into the passage between the three clamping rods and, on the other hand, a sufficient pre-alignment is obtained within this second section of the channel.

An additional concept of the present invention resides, in an arrangement for alignedly coupling two coated light-conductive fibers, in a combination comprising a support sleeve including two assembleble components, one of which has a tubular region which bounds a receiving recess and the other of which has at least an end region which is so configurated as to be fittingly received in the receiving recess on assembly; three clamping rods; means for so mounting said clamping rods in the other component of the support sleeve as to extend parallel to each other and define with one another a passage for receiving respective stripped end portions of the light-conductive fibers, the mounting means including at least one delectable portion; and means for inwardly deflecting the deflectable portion to press for clamping rods into a clamping contact with the end portions of the light-conductive fibers, including an actuating portion of the one component of the support sleeve. It is particularly advantageous when the support sleeve is elongated and when the components are displaceable along the longitudinal axis of the elongated support sleeve relative to each other during assembly and disassembly of the support sleeve. It is especially advantageous when the other component of the support sleeve has an axial depression in the end region, the depression being adapted to receive the mounting means. Then, the actuating portion of the one component of the support sleeve advantageously extends axially from a bottom surface which axially bounds the receiving recess, into the latter to penetrate into the axial depression of the other component of the support sleeve and act on the deflectable portion of the mounting means during and upon assembly. Under these circumstances, the respective end portion of the light-conductive fiber which is supported in the one component of the support sleeve extends beyond the actuating portion of the one component and into the receiving recess to be introduced into the passage between the clamping rods provided in the other component of the assembleble support sleeve during the assembly of the components. As a result of the above-enumerated inventive measures, there is obtained a coupling arrangement which essentially consists of two coupling components and which permits a simple and even a frequent disassembly and reassembly of the two components, particularly in view of the fact that the end portions of the two light-conductive fibers to be coupled always retain their positions in the associated components of the support sleeve of the disassembleable coupling. Any breaking or other damage to the end portion of the light-conductive fibers which extends beyond the actuating portion of the one component of the support sleeve is avoided in that the end portion is received within the confines of the depression of the one component of the support sleeve. This is attributable to the fact that the axial length of the receiving depression is so selected that there is obtained a secure guidance of the other component of the support sleeve within the receiving depression, prior to the penetration of the end portion of the light-conductive fiber into the passage between the three clamping rods.

The assembling introduction of the end region of the other component into the tubular region of the one component of the support sleeve can be obtained, in a very simple manner, by so configurating the means for connecting the components of the support sleeve to one another as to include an external projection on a first, and an external thread on a second, of said components, and a nut surrounding said components and having an internal thread engaging said external thread of the second component and an inwardly extending projection which engages said external projection of said one component to displace said components axially toward one another during assembly. Then, the final alignment of the axially registering end portions of the light-conductive fibers is achieved by tightening the nut. The connecting means may further include an axially extending bulge on one of the above-mentioned regions and an axially extending groove on the other of the regions, the groove so receiving the bulge as to prevent relative rotation of the components during assembly.

A further advantageous feature of the present invention resides in the fact that the above-mentioned clamping rods have respective ends which are generally flush with an axial end face of the other component of the support sleeve. In this connection, it is to be mentioned that the clamping rods are somewhat spread apart at the above-mentioned ends thereof when the two components of the support sleeve are not assembled with one another, as a result of the fact that they are mounted in the other component of the support sleeve in a cantilevered fashion. This measure according to the present invention achieves two substantial advantages. On the one hand, the introduction of the end portion of the light-conductive fiber which is supported in the one component of the support sleeve inbetween the spread-apart clamping rods, is facilitated, this being further enhanced by making the cantilevered end portions of the clamping rods conical. On the other hand, another considerable advantage obtained by resorting to this measure is to be seen in the fact that, when the clamping rods are pressed against one another during the tightening of the above-mentioned nut, the end portion of the light-conductive fiber which is supported in the one component of the support sleeve is subjected to a displacement component which is directed toward the other light-conductive fiber, whereby a fine adjustment is obtained.

It is further advantageous when the above-mentioned deflectable portion of the mounting means is an elastically yieldable O-ring interposed between the other component and the actuating portion of the one component and inwardly deflected upon assembly of the components. It is further advantageous when the other component of the support sleeve has another end region which is remote from the above-mentioned end region, and when the arrangement further comprises means for attaching a first of the light-conductive fibers to the other component of the support sleeve, including an actuating screw threaded into the other component to the other end region thereof. Then, the attaching means further includes another deflectable portion which is received in the other component around the clamping rods and which presses the latter into a clamping contact with the first light-conductive fiber upon tightening of the actuating screw.

Similarly, the one component of the support sleeve may have another region axially adjacent the tubular region, and there may be provided means for affixing a respective one of the light-conductive fibers to the one component of the support sleeve, the affixing means including three additional clamping rods which are so mounted in the other region of the one component of the support sleeve as to extend parallel to each other and define with one another an additional passage for partially receiving the respective light-conductive fiber, and means for inwardly pressing the additional clamping rods into a clamping engagement with that portion of the respective light-conductive fiber which is received between the additional clamping rods. Here again, the pressing means may include an actuating screw threaded into the other region of the one component of the support sleeve and additional mounting means having at least one deflectable portion which is interposed between the actuating screw and the one component and is inwardly deflected against the additional clamping rods upon tightening of the actuating screw.

Each of the above-mentioned actuating screws has a channel therein which partially accommodates the respective light-conductive fiber. Then, it is very advantageous when the arrangement further comprises means for de-tensioning at least that portion of each of the light-conductive fibers which is accommodated in the respective channel of the respective actuating screw, including a pair of sockets each of which surrounds one of the actuating screws and having one end connected to an another end remote from, the respectively associated one of the components of the support sleeve, and means for engaging the respective light-conductive fiber at the other end of each of the protective sockets and for transmitting tensile forces from the respective light-conductive fiber to the respective protective socket. By providing the de-tensioning means and the protective sockets, the same advantages as those discussed above in connection with the de-tensioning means and the protective socket of the basic arrangement of the present invention are also obtained in this modified arrangement.

Finally, it is also advantageous, according to a further aspect of the present invention, when the one component of the support sleeve bounds an elongated channel through which the respective fiber passes in a predetermined direction during the introduction thereof into the arrangement, the channel including, as considered in the above-mentioned direction, a first channel zone which partially accommodates the actuating screw and fully receives the mounting means, a second channel zone having a cross section large enough to partially receive the additional clamping rods, a third channel zone having a cross section coordinated to that of the respective stripped light-conductive fiber, and a fourth channel zone having a cross section large enough to partially receive the clamping rods of the other component upon assembly of the components of the support sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a partially sectioned side elevational view of a coupling arrangement of the present invention;

FIG. 2 is a view similar to FIG. 1 but illustrating a modification of the basic concept of the arrangement of the present invention;

DETAILED DISCUSSION OF THE PREFERRED EMBODIMENTS

Figure 3:
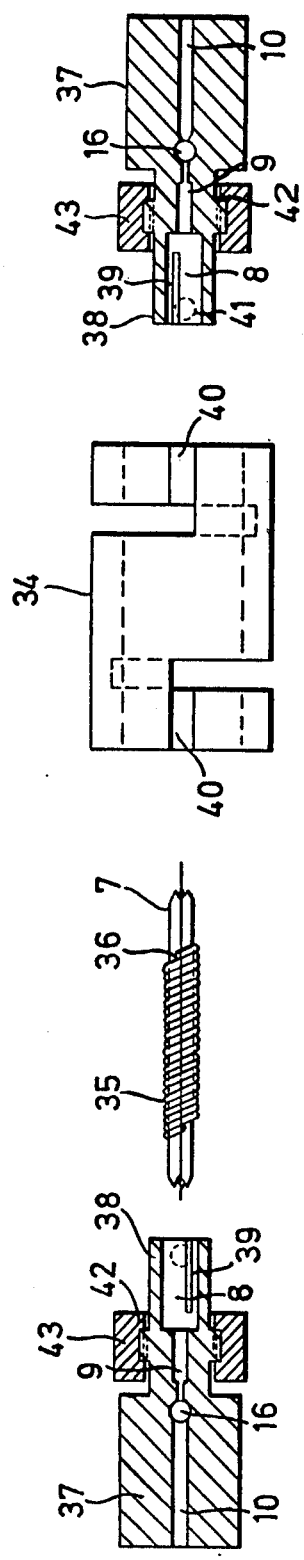
FIG. 3 is an exploded view illustrating still a further modification of the basic concept of FIG. 1.

Referring now to the drawings in detail, and first to FIG. 1 thereof, it may be seen that the reference numeral 1 has been used to designate a generally cylindrical support sleeve which also acts as a spacing member. Distancing rings 2 are introduced into the support sleeve 1 from both ends thereof and abut the latter. An O-ring 3, which acts as a pressing ring, and a further distancing ring 2, axially adjoin each of the above-mentioned distancing rings 2. A light-conductive fiber 6 is partially accommodated within the support sleeve 1 and an end portion thereof is received in a passage which is defined between three clamping rods 7, preferably of a metallic material, which clamping rods 7 have their generally parallel axes located in the vertices of an imaginary isosceles triangles. An actuating screw 4 which is adapted to be threaded into the support sleeve 1, acts on the accessible distancing ring 2 which, in turn, compresses the O-ring 3 between itself and the other distancing ring 2 so that the O-ring 3 deflects inwardly and thus presses the clamping rods 7 into a clamping contact with the end portion of the light-conductive fiber 6 which has been stripped of its protective coating.

The actuating screw 4 partially accommodates the clamping rods 7 and, because of its configuration, protects the clamping rods 7 from axial shifting. The actuating screw 4 is provided with a central channel which includes three different sections 8, 9 and 10. The first section 8 serves to partially accommodate the triangularly arranged clamping rods 7, the second, intermediate, section 9 has a diameter which amounts to approximately two to three times the diameter of the stripped end portion of the light-conductive fiber 6, and the third, outermost, section 10 has a diameter which is coordinated with the diameter of the coated light-conductive fiber 6. The intermediate section 9 serves as a guide and a pre-aligner for the end portion of the light-conductive fiber 6 and renders it possible to easily, simply and securely introduce the end portion of the light-conductive fiber 6 into the arrangement and into the passage defined between the clamping rods 7.

A radially extending inspection opening 16 is provided in the actuating screw 4 between the first section 8 and the second section 9 of the channel, the inspection opening 16 rendering it possible to observe the light-conductive fiber 6 during its introduction into the passage bounded by the clamping rods 7. The actuating screw 4 is surrounded by a protective socket 11, one end of which is threadedly connected to the cylindrical support sleeve 1. At the other, free, end of the respective socket 11, there is provided a transverse wall 12 which may be either of one piece with, or threadedly connected to, the remainder of the respective socket 11. The protective socket 11 serves the purpose of securing a coating or jacket 13 of the light-conductive fiber 6 from shifting, and thus de-tensioning that portion of the light-conductive fiber which is located in the interior of the arrangement. To this end, there is provided an elastic O-ring 15 which is accommodated in an annular depression 14, the O-ring 15 being inwardly deflected into contact with the jacket 13 of the light-conductive fiber 6 during the tightening of the protective socket 11, as a result of being interposed between the transverse wall 12 and the end face of the actuating sleeve 4. The protective socket 11 which is equipped with the transverse wall 12 constitutes a protection, particularly of the stripped end portion of the light-conductive fiber 6, from dust, moisture and temperature oscillations.

FIG. 2 illustrates a structural modification of the basic concept revealed in FIG. 1. The coupling arrangement in FIG. 2 includes many parts which are similar to those discussed above in connection with FIG. 1 so that the same reference numerals have been used to designate such similar parts. The coupling arrangement includes a support sleeve 22 which consists of two components 20 and 21 which can be threadedly connected to one another. An annular recess 24 is provided in the interior of the support sleeve 22, and an annular projection 26 of a mounting body 25 is received in the annular recess 24 and secures the mounting body 25 against axial displacement relative to the support sleeve 22. The mounting body 25 consists of two parts and has conically converging end portions. The three above-mentioned clamping rods 7 are arranged within the mounting body 25. Here again, an actuating screw, this time indicated by the reference numeral 27, serves the actuating function. As in the construction of FIG. 1, this actuating screw 27 is provided with a central channel which has the three above-discussed channel sections. That end of the actuating screw 27 which extends into the support sleeve 22 has a conical configuration which is coordinated to the respective conical end portion of the mounting body 25. Now, when the actuating screw 27 is threaded into the support sleeve 22, the conical surfaces of the actuating screw 27 will exert a radially inwardly directed pressure on the respective end portion of the mounting body 25. In turn, the mounting body 25, whose end portions are being inwardly deflected in the above-mentioned manner, exerts a radially inwardly directed pressure on the clamping rods 7 which are located in the interior of the mounting body 25, as a result of which the ends of the respective light-conductive fibers, which meet each other in the passage bounded by the clamping rods 7, are aligned with one another. The positioning of the clamping rods 7 in the mounting body 25, and the introduction of the end portions of the light-conductive fibers 25 between the clamping rods 7, are greatly facilitated by the bipartite construction of the mounting body 25.

As also illustrated in FIG. 2, the actuating screw 27 is provided, at its end which projects outwardly of the support sleeve 22, with a conically configurated end portion 29. The end portion 29 is subdivided or interrupted by a slot 28. This conical end portion 29 serves to de-tension the end portion of the light-conductive fiber which is introduced into the arrangement. This de-tensioning is achieved by providing the protective socket 30 with a conical abutment surface 31 which is configurated compatibly to the configuration of the conical end portion 29 of the actuating screw 27. Thus, when the protective socket 30 is threaded onto the support sleeve 22, the abutment surface 31 acts radially inwardly on the slotted end portion 29 of the screw 27, thus deflecting the latter inwardly into an engagement with the light-conductive fibers 6. Inasmuch as the coupling arrangement of FIG. 2, as well as that of the previously discussed FIG. 1, is symmetrical, only a central portion and one end portion of each of these coupling arrangements have been illustrated in detail.

FIG. 3 reveals the alternative of the coupling arrangement according to the present invention. Here again, the coupling arrangement includes a support sleeve, this time indicated by the reference numeral 34. The support sleeve 34 serves to accommodate the clamping rods 7 by means of which the end portions of the light-conductive fibers 6, which have been omitted from the exploded view of FIG. 3, are centered and arrested in position relative to one another. The clamping rods 7 are surrounded by a helical spring 35. The helical spring 35 has ends 36 which extend radially outwardly from the spring 35. The clamping rods 7 are introduced into the support sleeve 34 together with the helical spring which acts as a deflectable body or portion. Actuating elements 37 are introducible into the support sleeve 34 through the ends thereof and serve the same purpose as the above-discussed actuating elements 4 and 27. Thus, each of the actuating elements 37 is also provided with the above-discussed channel having the three channel sections 8, 9 and 10. That portion 38 of the actuating element 37 which surrounds the first channel section 8 is outwardly cylindrical and its outer diameter is accommodated to the opening diameter of the support sleeve 34. This outwardly cylindrical portion 38 is provided with a guiding slot 39 which extends substantially axially of the portion 38. The end 36 of the helical spring 35 is received and guided in this guiding slot 39 when the actuating element 37 is introduced into the support sleeve 34.

The support sleeve 34 is formed with L-shaped guiding slots 40 at both of its axial ends. The above-mentioned cylindrical portion 38 of the actuating element 37 has a radially outwardly extending arresting projection 41, which projection 41 is introduced into and guided in one of the guiding slots 40 when the actuating element 37 is introduced into the support sleeve 34. Now, when the actuating element 37 is rotated in such a manner that the projection 41 is guided in the circumferential leg of the L-shaped slot 40, the helical spring 35 is tensioned and also reduced in diameter inasmuch as the ends 36 which are received in the slots 29 of the actuating elements 37 are angularly disposed about the axis of the helical spring 35 during the rotation of the actuating elements 37. Simultaneously therewith, the projections 41 arrest the actuating elements 37 against accidental axial movement relative to the support sleeve 34.

An external thread 42 is provided on the cylindrical portion 38 of the actuating element 37 remote from the end face of the portion 38. An adjusting and blocking nut 43 is threaded onto the thread 42 and serves to arrest the actuating element 37 in its final position relative to the support sleeve 34. This particular coupling arrangement has the advantage that it can be made exclusively of metallic parts and that it is relatively temperature-independent.

Figure 4:
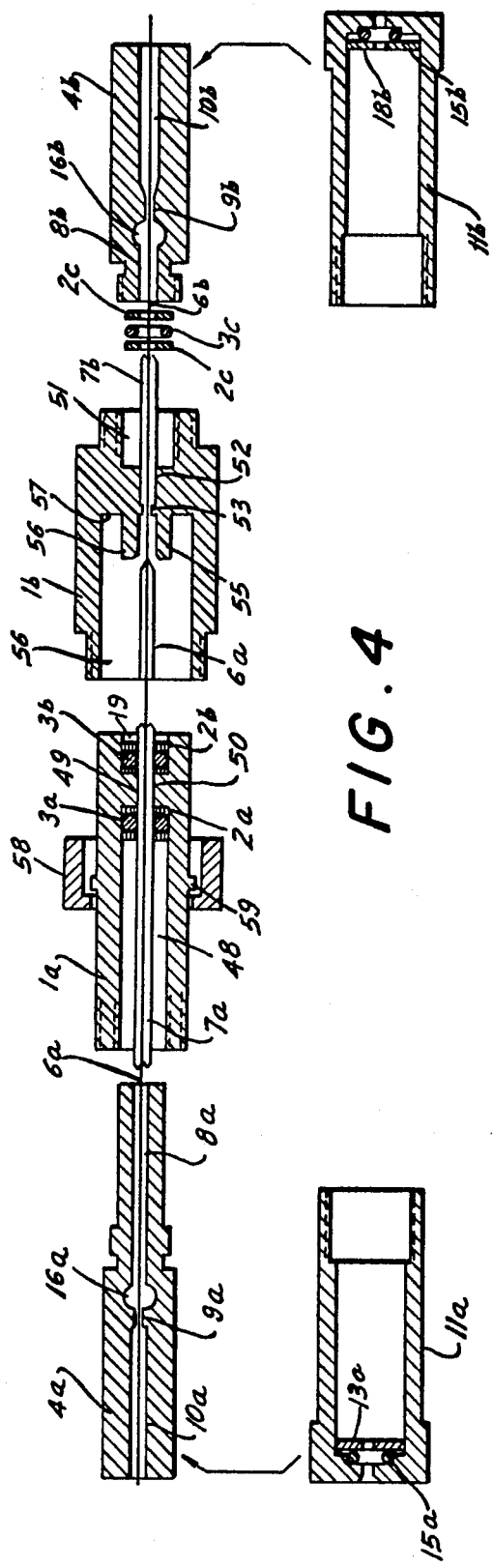
FIG. 4 is a view similar to FIG. 3 but of yet another modification of the basic concept revealed in FIG. 1.
Figure 5:
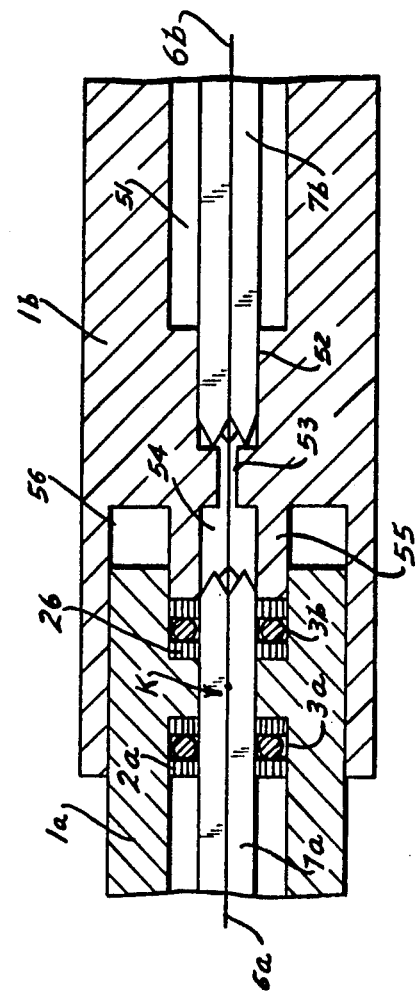
FIG. 5 is a sectional view of a fragment of FIG. 4 and in an assembled condition thereof.

Referring now to a further development of the basic concept of the present invention which is illustrated in FIGS. 4 and 5, it may be seen that the support sleeve of this coupling arrangement includes two components 1a and 1b which are assembled with one another in the axial direction. The component 1 is substantially cylindrical and includes a first axial channel zone 48, a second channel zone 49 adjacent thereto and having a smaller diameter and, next to it, a channel zone 19 which has a diameter at least approximating that of the channel zone 49. The channel zone 49 is provided in a spacing land 50 which is located between the channel zones 48 and 19.

Distancing rings 2a and 2b abut this spacing land 50 from the two axial sides thereof. The distancing rings 2a, 2b are respectively adjoined by O-rings 3a, 3b which are inwardly deflectable, and further distancing rings 2a, 2b. The light-conductive fiber 6a is clamped, in the same manner as discussed previously, between the clamping rods 7a which are acted upon in the radially inward direction by the O-ring 3a confined between the distancing rings 2a, when the actuating element or screw 4a is introduced into and advanced in, the channel zone 48. The configurations and functions of the parts of this coupling arrangement which has been identified with reference numerals supplemented with letters are the same as those which have been designated by only the reference numerals without the letters in the previous discussion.

The actuating element 4a, which is preferably an actuating screw which is threadedly received in the channel zone 48, partially accommodates the clamping rods 7a and, as a result of its configuration, blocks the clamping rods 7a against axial shifting. The actuating element 4a has a central channel which is subdivided into three channel sections 8a, 9a and 10a in the above-discussed manner. Thus, here again, the first section 8a partially accommodates the triangularly distributed clamping rods 7a, the second, intermediate, section 9a has a diameter which is approximately two to three times greater than the diameter of the stripped light-conductive fiber 6a, and the third section 10a has a diameter which is coordinated to the diameter of the coated light-conductive fiber 6a. Here again, a conical transition is provided between the second and third sections 9a, 10a so that the intermediate section 9a, together with the conical transition, pre-align the stripped end portion of the fiber 6a and render it possible to simply but reliably introduce the end portion of the light-conductive fiber 6a into the passage bounded by the clamping rods 7a.

A radially extending observation bore 16a is located between the first section 8a and the second section 9a, which renders it possible to supervise the process of introduction of the light-conductive fiber 6a into the passage between the clamping rods 7a. The actuating element 4a is surrounded by a protective socket 11a which serves the dual purpose of protecting the interior of the coupling arrangement from penetration of dust, humidity or heat thereinto, and of de-tensioning the end portion of the light-conductive fiber 6a. To this end, the protective socket 11a is equipped with an elastic O-ring 15a which abuts against, for instance, an inwardly projecting flange, the O-ring 15a being adjoined by a distancing ring 18a which, in the assembled condition, abuts the end face of the actuating element 4a.

The component 1b bounds several channel zones which have a common axis. A first zone 51 serves to accommodate two distancing rings 2c, an O-ring 3c received between the distancing rings 2c, and the threaded end portion of the actuating element or screw 4b which has the same construction and function as the actuating element 4a and which is also surrounded by a protective sleeve 11b which again is identical and serves the same purpose as the protective sleeve 11a.

A second channel zone 52 adjoins the first channel zone 51, having a cross section large enough to receive the end portions of three additional clamping rods 7b. A third channel zone 53 has a diameter which is slightly greater than the diameter of the stripped light-conductive fiber 6b which is held in position by the clamping rods 7b. Finally, a fourth channel zone 54 which adjoins the third channel zone 53 in the axial direction of the component 1b serves to accommodate the ends of the clamping rods 7a which are supported in the support sleeve component 1a.

The fourth channel zone 54 is provided coaxially in an actuating projection 55 of the component 1b. As a result of the provision of the fourth channel zone 54 therein, the actuating projection 55 obtains a sleeve-shaped configuration. During assembly of the components 1a and 1b, the sleeve-shaped actuating projection 55 penetrates into the first channel portion 19 of the component 1a. The sleeve-shaped actuating portion 55 of the component 1b is located at a bottom surface 57 of a receiving recess 56 bounded by a tubular region of the component 1b, the receiving recess 56 serving to receive the end region of the component 1a. Preferably, the actuating portion 55 has an axial dimension which amounts to approximately one-third of the depth of the receiving recess 56. The light-conductive fiber 6b, particularly the stripped end portion thereof, extends outwardly of the fourth channel zone 54 and beyond the actuating projection 55 into the receiving recess 56, but only to such an extent that it is accommodated in the latter and protected against damage by the tubular region of the component 1b.

The light-conductive fibers 6a and 6b which are respectively affixed to the components 1a and 1b upon tightening of the actuating elements or screws 4a and 4b can now be coupled with one another at their respective end portions in that the components 1a and 1b are assembled with one another in a plug-in manner, as illustrated particularly in FIG. 5. As the end region of the component 1a is being introduced into the receiving recess 56 bounded by the tubular region of the component 1b, the actuating portion 55 is first centered in the first channel portion 19 of the component 1a, until the end portion of the light-conductive fiber 6b is introduced into the passage between the clamping rods 7a which is slightly widened due to the cantilevered support of the clamping rods 7a on the deflectable O-ring 3a, the introducing end of the passage being made even wider by conically configurating the ends of the clamping rods 7a.

A connecting nut 58 surrounds the component 1a and, upon assembly, engages an external thread on the tubular region of the component 1b and, with an inwardly oriented flange, a projection 59 provided exteriorly on the component 1a. When this nut 58 is being tightened, the end of the light-conductive fiber 6b is shifted further into the passage between the clamping rods 7a in direction toward the end portion of the light-conductive fiber 6a. Simultaneously therewith, the actuating portion 55 of the component 1b enters the first channel portion 19 of the component 1a, so that the slightly spread-apart clamping rods 7a are pushed together by the inwardly directed forces exerted upon them by the O-ring 3b which is being compressed by the action of the actuating projection 55. Thus, upon the termination of the tightening of the nut 58, even the end portion of the light-conductive fiber 6b is securely clamped between the clamping rods 7a.

The components 1a and 1b are preferably provided with an arrangement for preventing mutual rotation of the components 1a and 1b during assembly, such an arrangement including an axially extending groove 56 on the component 1b and a correspondingly configurated interengaging bulge on the component 1a, or vice versa, to give an example.

It will be appreciated that, because of their construction, the components 1a and 1b can be frequently disassembled and reassembled and that a perfect alignment of the end portions of the light-conductive fibers 6a and 6b is obtained during each reassembly. The reference character K which appears in FIG. 5 indicates the point of juxtaposition of the end portions of the light-conductive fibers 6a and 6b. It will also be realized that, instead of using the deflectable arrangement consisting of the O-rings 3a, 3b or 3c, there could be employed the conical arrangement discussed above in connection with FIG. 2 or the helical spring discussed in connection with FIG. 3, while the O-rings 15a and 15b could be substituted by the conical arrangement illustrated in FIG. 2. When this modification is attended to, it is provided that the coupling arrangement becomes temperature-independent.

It will be understood that each of the elements described above, or two or more together, may also find a useful application in other types of constructions differing from the types described above.

While the invention has been illustrated and described as embodied in a coupling arrangement for light-conductive fibers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for aligning and coupling two coated light-conductive fibers, comprising a first guide member having a channel to support a first fiber to be coupled to a second fiber, a second guide member having a channel to support an end of the second fiber, said channel including a first section of a relatively large diameter, an intermediate section of a relatively small diameter to receive a stripped end portion of the second fiber and a third section coordinated to the diameter of the coated light-conductive second fiber; at least three clamping rods inserted into a space provided in said first guide member and partially extending into said first section of said second guide member, said clamping rods being arranged to engage the abutted stripped end portions of said fibers; a protective socket surrounding said second guide member and having an opening at one end thereof to receive said second coated light-conductive fiber, said protective socket having a recess communicating with said opening and a resilient O-ring inserted into said recess to yieldably engage said second coated light-conductive fiber when it is inserted into said third section of the channel formed in the second guide member; and deflectable means encompassing said clamping rods to maintain said clamping rods in clamping contact with said stripped end portions, said deflectable means being positioned on said clamping rods substantially at the middle thereof, said second guide member being connected to the first guide member and arranged to connect the channel formed in the first guide member to the channel formed in the second guide member thereby providing radial forces for pressing said deflectable means inwardly into contact with said clamping rods to hold said stripped end portions in aligned and abutting position.

2. An apparatus for aligning and coupling two coated light-conductive fibers, comprising a first guide member having a channel to support a first fiber to be coupled to a second fiber, a second guide member having a channel to support an end of the second fiber, said channel including a first section of a relatively large diameter, an intermediate section of a relatively small diameter to receive a stripped end portion of the second fiber and a third section coordinated to the diameter of the coated light-conductive second fiber; at least three clamping rods inserting into a space provided in said first guide member and partially extending into said first section of said second guide member, said clamping rods being arranged to engage the abutted stripped end portions of said fibers; a protective socket surrounding said second guide member and having an opening at one end thereof to receive said second coated light-conductive fiber, and deflectable means encompassing said clamping rods to maintain said clamping rods in clamping contact with said stripped end portions, said deflectable means being positioned on said clamping rods substantially at the middle thereof and including two rings positioned in spaced relationship and a resilient O-ring interposed therebetween, said second guide member being connected to the first guide member and arranged to connect the channel formed in the first guide member to the channel formed in the second guide member thereby providing radial forces for pressing said deflectable means inwardly into contact with said clamping rods to hold said stripped end portions in aligned and abutting position.

3. The apparatus as defined in claim 2, wherein a recess is formed in said protective socket and associated with said opening, and a resilient O-ring is mounted in said recess to yielably engage said second light conductive fiber.

4. The apparatus as defined in claim 2, wherein said first guide member has a recess therein and said second guide member has a projection at one end thereof which extends into said recess upon assembly.

5. An apparatus for aligning and coupling two coated light-conductive fibers, comprising a first guide member having a channel to support a first fiber to be coupled to a second fiber, a second guide member having a channel to support an end of the second fiber, said channel including a first section of a relatively large diameter, an intermediate section of a relatively small diameter to receive a stripped end portion of the second fiber and a third section coordinated to the diameter of the coated light-conductive second fiber; at least three clamping rods inserted into a space provided in said first guide member and partially extending into said first section of said second guide member, said clamping rods being arranged to engage the abutted stripped end portions of said fibers; a protective socket surrounding said second guide member and having an opening at one end thereof to receive said second coated light-conductive fiber; and deflectable means encompassing said clamping rods to maintain said clamping rods in clamping contact with said stripped end portions, said deflectable means being positioned on said clamping rods substantially at the middle thereof and including a mounting body having a conical surface, said second guide means having a conical recess complementary to said conical surface and abutting said mounting body, said second guide member being connected to the first guide member and arranged to connect the channel formed in the first guide member to the channel formed in the second guide member thereby providing radial forces for pressing said deflectable means inwardly into contact with said clamping rods to hold said stripped end portions in aligned and abutting position.

6. The apparatus as defined in claim 2 or 5 wherein a conical transition surface is formed between said first section and said third section.

7. The apparatus as defined in claim 2 or 5, wherein said clamping rods are cylindrical and of substantially the same diameter.

8. The apparatus as defined in claim 2 or 5, wherein said second guide member is an elongated member and the channel formed therein extends along the longitudinal axis of the member.

9. An apparatus for aligning and coupling two coated light-conductive fibers, comprising a first guide member having a channel to support a first fiber to be coupled to a second fiber, a second guide member having a channel to support an end of the second fiber, said channel including a first section of a relatively large diameter, an intermediate section of a relatively small diameter to receive a stripped end portion of the second fiber and a third section coordinated to the diameter of the coated light-conductive second fiber; at least three clamping rods inserted into a space provided in said first guide member and partially extending into said first section of said second guide member, said clamping rods being arranged to engage the abutted stripped end portions of said fibers; and deflectable means encompassing said clamping rods to maintain said clamping rods in clamping contact with said stripped end portions, said deflectable means being positioned on said clamping rods substantially at the middle thereof and including an intermediate sleeve and a helical spring surrounding said clamping rods, said intermediate sleeve receiving said clamping rods with said helical spring, said second guide member being connected to the first guide member and arranged to connect the channel formed in the first guide member to the channel formed in the second guide member thereby providing radial forces for pressing said deflectable means inwardly into contact with said clamping rods to hold said stripped end portions in aligned and abutting position.

10. The apparatus as defined in claim 9 wherein a conical transition surface is formed between said first section and said third section.

11. The apparatus as defined in claim 9 wherein said clamping rods are cylindrical and of substantially the same diameter.

12. An apparatus for aligning and coupling two coated light-conductive fibers, comprising a first guide member having a first channel to support a first fiber to be coupled to a second fiber, a second guide member having a second channel to support a second fiber, each of said channels respectively including a first section of a relatively large diameter, an intermediate section of a relatively small diameter to receive a stripped end portion of the respective fiber and a third section coordinated to the diameter of the coated light-conductive respective fiber; an intermediate guide member adapted to be coupled between said first guide member and said second guide member and including a first element and a second element connectable to said first element; said first and second elements each being formed with a recess and with an opening to receive the respective fibers, the opening of said first element being aligned in assembly with the opening of said second element; a first set of at least three clamping rods inserted into the opening of said first element and partially extending into the first section of said first guide member and arranged to engage the abutted stripped end portions of said fibers; a second set of at least three clamping rods for guiding an end portion of said second fiber, said second set of the clamping rods being inserted into the opening of said second element and partially extending into the first section of said second guide member; a first protective socket surrounding said first guide member and adapted to receive the first fiber therethrough; a second protective socket surrounding said second guide member and adapted to receive the second fiber therethrough; first deflectable means encompassing said first set of the clamping rods to maintain the clamping rods in clamping contact with said stripped end portions, said first deflectable means being positioned in the recess of said first element and including two rings positioned in spaced relationship and a resilient O-ring interposed therebetween; and second deflectable means encompassing said second set of the clamping rods to maintain the clamping rods in clamping contact with the second fiber, said second deflectable means being positioned in the recess of said second element and including two rings positioned in spaced relationship and a resilient O-ring interposed therebetween, said first guide member being connected to said first element and said second guide member being connected to said second element while said first element is connected to said second element so that in assembly said first channel, said first opening, said second opening and said second channel will be aligned with each other to receive respective end portions of the fibers to be coupled and radial forces will be provided for pressing said first and second deflectable means inwardly into contact with the respective clamping rods to hold said stripped end portions in aligned and abutting position.

13. The apparatus as defined in claim 12, wherein a conical transition surface is formed between said first section and said third section in each of said guide members.

14. The apparatus as defined in claim 12, wherein said clamping rods are cylindrical and of substantially the same diameter.

* * * * *